US012404725B2

(12) United States Patent
Polonen et al.

(10) Patent No.: US 12,404,725 B2
(45) Date of Patent: Sep. 2, 2025

(54) VALVE CYLINDER, IMPACT DEVICE AND METHOD

(71) Applicant: SANDVIK MINING AND CONSTRUCTION OY, Tampere (FI)

(72) Inventors: Juha Polonen, Tampere (FI); Jarkko Niemi, Tampere (FI); Timo Kela, Tampere (FI)

(73) Assignee: Sandvik Mining and Construction Oy, Tampere (FI)

(*) Notice: Subject to any disclaimer, the term of this patent is extended or adjusted under 35 U.S.C. 154(b) by 0 days.

(21) Appl. No.: 18/714,608

(22) PCT Filed: Dec. 2, 2022

(86) PCT No.: PCT/EP2022/084165
§ 371 (c)(1),
(2) Date: May 30, 2024

(87) PCT Pub. No.: WO2023/099716
PCT Pub. Date: Jun. 8, 2023

(65) Prior Publication Data

US 2025/0027368 A1 Jan. 23, 2025

(30) Foreign Application Priority Data

Dec. 3, 2021 (EP) .................................... 21212280

(51) Int. Cl.
*E21B 1/38* (2006.01)
*B25D 9/20* (2006.01)
*E21B 1/26* (2006.01)

(52) U.S. Cl.
CPC .................. *E21B 1/38* (2020.05); *B25D 9/20* (2013.01); *E21B 1/26* (2020.05); *B25D 2209/005* (2013.01)

(58) Field of Classification Search
CPC ........ E21B 1/02; B25D 2209/005; B25D 9/18; B25D 9/20
See application file for complete search history.

(56) References Cited

U.S. PATENT DOCUMENTS 3,971,448 A * 7/1976 Crover ..................... B25D 9/18 173/208
6,155,353 A * 12/2000 Ottestad ................. B25D 9/145 173/208

FOREIGN PATENT DOCUMENTS

EP 3100828 A1 12/2016
EP 3100829 A1 12/2016
WO 2012168558 A1 12/2012
WO WO-2012168559 A1 * 12/2012 ............... B25D 9/12

* cited by examiner

*Primary Examiner* — Abiy Teka
(74) *Attorney, Agent, or Firm* — Corinne R. Gorski

(57) ABSTRACT

A hydraulic system, rock drilling rig, and method for limiting output performance of a hydraulic drilling actuator temporarily under execution of a safety function feature of a hydraulic system is provided. The output performance is limited by limiting produced hydraulic fluid flow in a hydraulic circuit of the hydraulic drilling actuator, whereby a restricted magnitude of the fluid flow is produced at a hydraulic pump. This way a restricted operation mode is enabled and is controlled by a control unit.

9 Claims, 3 Drawing Sheets

VALVE CYLINDER, IMPACT DEVICE AND METHOD

RELATED APPLICATION DATA

This application is a § 371 National Stage Application of PCT International Application No. PCT/EP2022/084165 filed Dec. 2, 2022 with priority to EP 21212280.8 filed Dec. 3, 2021.

BACKGROUND OF THE INVENTION

The invention relates to a valve cylinder for a hydraulic impact device of a rock breaking apparatus.

The invention further relates to an impact device of a rock breaking apparatus and to a method of preventing cavitation in a hydraulic impact device of a rock breaking apparatus.

The field of the invention is defined more specifically in the preambles of the independent claims.

In mines and at other work sites different type of rock breaking apparatuses are used for drilling drill holes to rock surfaces and breaking rock and other hard materials. The rock breaking apparatuses are typically hydraulically powered and comprise hydraulic impact devices with reciprocating percussion pistons. Working cycle of the percussion piston can be controlled by a sleeve-like control valve which may be pilot controlled. The control valve may be mounted inside a control space of a valve cylinder. The known solutions have shown some disadvantages which especially relate to hydraulic cavitation which is detrimental to durability of the components of the impact device.

BRIEF DESCRIPTION OF THE INVENTION

An object of the invention is to provide a novel and improved valve cylinder and an impact device, and a method for preventing cavitation in a hydraulic impact device of a rock breaking apparatus.

The valve cylinder according to the invention is characterized by the characterizing features of the first independent apparatus claim.

The impact device according to the invention is characterized by the characterizing features of the second independent apparatus claim.

The method according to the invention is characterized by the characterizing features of the independent method claim.

An idea of the disclosed solution is that the valve cylinder of a hydraulic impact device of a rock breaking apparatus is an elongated piece with a central axis. The valve cylinder comprises a central opening extending from a front end of the elongated valve cylinder to its rear end. A percussion piston of the impact device is mountable through the central opening. There are at least two pressure spaces limited by radial surfaces of the central opening. The pressure spaces are located at an axial distance from each other. Several axial pressure fluid channels are arranged to connect the mentioned pressure spaces. One of the mentioned pressure spaces is a control pressure space located at the rear end portion of the valve cylinder. The control pressure space is configured to receive a sleeve-like control valve for controlling working cycle of the percussion piston. The control pressure space is provided with an inner radial groove comprising a bottom surface defining radial extension of the groove in relation to the central opening adjacent the groove. Further, the mentioned axial pressure fluid channels pass the radial groove in axial direction without fluid connection with the groove. The cross-sectional shape of the bottom of the mentioned radial groove is rotationally non-symmetrical and comprises surfaces at several different distances from the central axis. In other words, there is not just one circumference in the radial groove forming its bottom surface, but instead, there are several different surface configurations defining the groove bottom or bottom line.

An advantage of the disclosed solution is that the size of the radial groove can be increased when compared to a simple groove with circular bottom surface. And further, the increase in size is possible even though the axial pressure fluid channels limit the usable space for enlarging the groove. In the disclosed solution the bottom surface is formed of several suitably shaped portions which can bypass the axial pressure fluid channels.

According to an embodiment, the aim of the disclosed shaping of the groove is to increase fluid volume of the groove and to thereby decrease possible operational situations where cavitation may occur.

According to an embodiment, the rock breaking apparatus is a rock drilling machine.

According to an embodiment, the rock breaking apparatus is alternatively a breaking hammer.

According to an embodiment, the valve cylinder is a cartridge mountable inside a basic body of the impact device.

According to an embodiment, the valve cylinder is a pilot valve cylinder, inside which the sleeve-like control valve is moved towards reverse direction by means of pilot pressure pulses fed through the mentioned axial pressure fluid channels.

According to an embodiment, the bottom surface of the radial groove comprises several curved surfaces. In other words, the bottom of the groove has curved cross-sectional configuration. An advantage of this embodiment is that bottom surface is provided with curved shapes which are hydrodynamically beneficial and do not thereby cause disturbances to hydraulic flows. The curved shapes and surfaces ensure smooth fluid flows.

According to an embodiment, the bottom surface comprises only curved shapes.

According to an embodiment, the bottom of the groove comprises surfaces with at least three different radiuses of curvature R1, R2, R3.

According to an embodiment, the axial fluid channels of the valve cylinder are evenly spaced around the central opening in the cross-section at the radial groove. Then there are intermediate sections between the axial fluid channels. The groove has its minimum radial dimensions at the axial fluid channels and maximum radial dimensions at the mentioned intermediate sections.

According to an embodiment, in addition to the features of the previous embodiment, the radial dimensions of the grooves at the intermediate sections are greatest at the middle of the intermediate sections and decrease continuously from the middle towards sections with the axial fluid channels, whereby the shapes of the bottoms are curved at the intermediate sections.

According to an embodiment, the shapes of bottoms of the grooves at the mentioned intermediate sections are circular arches.

According to an embodiment, the bottom of the groove at the intermediate section may have any other curved shape than the mentioned circular arch. Then radius or curvature may change continuously or gradually, for example.

According to an embodiment, number of the axial fluid channels is three. In other words, there are three axial fluid channels spaced at 120° orientation relative to each other. At the axial fluid channels are channel sections and between them are intermediate sections. Totally there are three channel sections and three intermediate sections.

According to an embodiment, in some structures the axial fluid channels may be spaced unevenly around the central opening.

According to an embodiment, the number of the axial fluid channels may be 2-8.

According to an embodiment, the groove is made by milling techniques.

According to an embodiment, the groove is made by means of a modern CNC lathe by utilizing synchronized turning movement and cutting tool movement. A further possibility is to implement a modern computer numerical controlled turning center.

According to an embodiment, the groove bottoms at the intermediate sections can be made by means of a rotating side-milling cutter. The groove bottoms for the intermediate sections are quick and inexpensive to manufacture.

According to an embodiment, the groove bottoms at the intermediate sections can be made by means of a rotating end mill. Then the shape of the bottom can be designed freely. Modern numerically controlled machining centers can realize desired cutting tool paths accurately.

According to an embodiment, the radial groove is located at a front end portion of the control pressure space.

According to an embodiment, the bottom of the radial groove is provided with at least one transverse fluid channel providing fluid connection between the groove and an outer surface of the valve cylinder. In other words, the groove serves as a part of a fluid path intended for conveying fluid flows.

According to an embodiment, the axial fluid channels are spaced around the central opening whereby the cross-section of the valve cylinder comprises fluid channel sections and intermediate sections between the fluid channel sections. The bottom of the radial groove is provided with several transverse fluid channels at each intermediate section. Because of the non-circular shape of the bottom surface of the groove nominal thickness of wall of the valve cylinder at the groove may be smaller at the intermediate sections compared to the fluid channel sections. In other words, the valve cylinder may have varying wall thickness in at the cross section of the groove.

According to an embodiment, the disclosed solution relates to an impact device of a rock breaking apparatus. The impact device comprises: a body provided with a central space; a percussion cartridge arranged axially inside a rear portion of the mentioned central space and comprising a valve cylinder; a percussion piston passing through the percussion cartridge and being movable in an impact direction towards a front end of the impact device and in a reverse direction towards a rear end of the impact device; a working pressure space provided with hydraulic pressure fluid for moving the percussion piston in the reverse direction; a control pressure space at a rear end of the valve cylinder and being provided with a sleeve-like control valve for controlling hydraulic pressure affecting at the control pressure space and to thereby controlling reciprocating movement of the percussion piston; and wherein the valve cylinder is provided with a pilot pressure space for providing pressure pulses in response to movement of the percussion piston in the impact direction; and the valve cylinder is further provided with several axial fluid channels for connecting the pilot pressure space and the control pressure space. Furthermore, the valve cylinder of the impact device is in accordance with the embodiments and features disclosed in this application.

According to an embodiment, the disclosed solution relates to a method of preventing cavitation in a hydraulic impact device of a rock breaking apparatus. The method comprises: increasing volume of a hydraulic space between an inner surface of a control pressure space of the impact device and an outer surface of a sleeve-like control valve mounted reciprocatively inside the control pressure space; providing the mentioned inner surface of the control pressure space with a groove at a cross-section where are several transverse fluid channels arranged for feeding hydraulic pressure fluid to and from the control pressure space; and increasing the volume by shaping a bottom of the groove to expand towards an outer surface of the impact device at the mentioned transverse fluid channels whereby there are reduced wall thicknesses only at the transverse fluid channels and the shape of a bottom line of the groove deviates from a circle.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
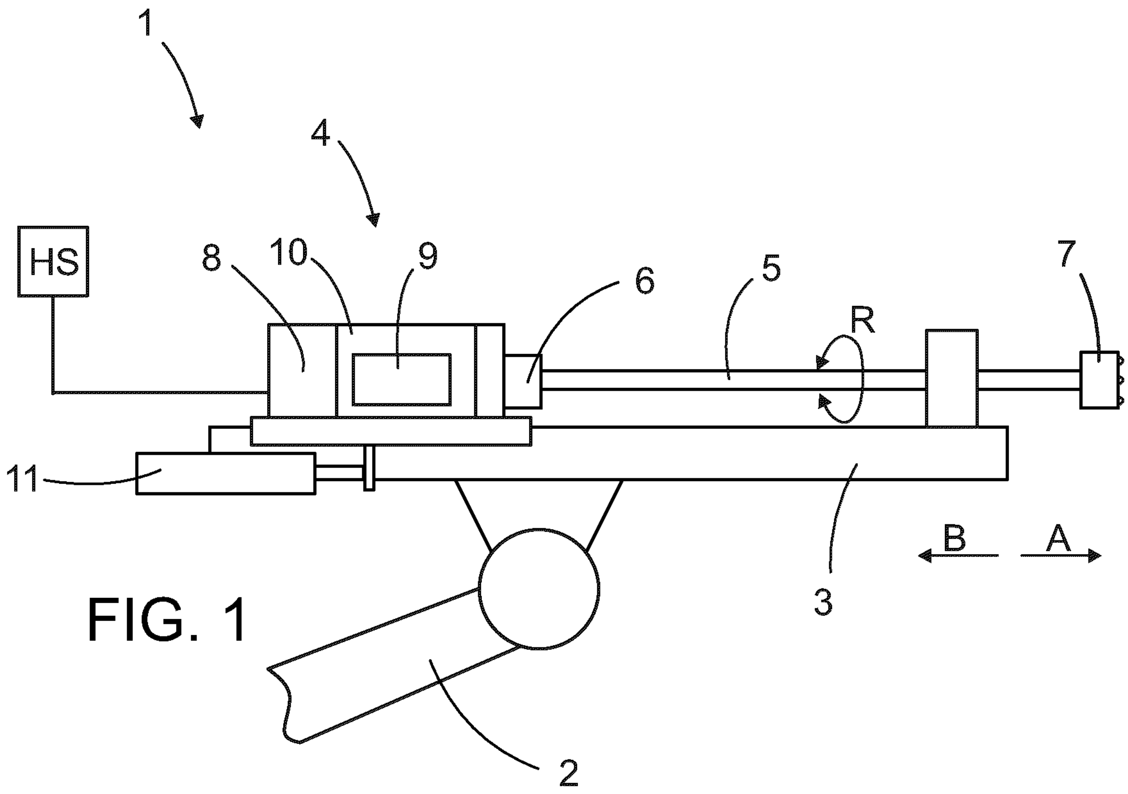
FIG. 1 is a schematic side view of a rock drilling unit provided with a hydraulic rock drilling machine.

FIG. 1 shows a rock drilling unit 1 intended for drilling holes to a rock surface. The rock drilling unit 1 is typically mounted to a drilling boom 2 of a rock drilling rig. The drilling unit 1 is provided with a feed beam 3 and a rock drilling machine 4 supported on it. A drilling tool 5 is connectable to the drilling machine 4. The rock drilling machine 4 may comprise a shank adaptor 6 at a front end of the rock drilling machine 4 for connecting the tool 5. At an opposite end of the tool 5 is a drill bit 7. The rock drilling machine 4 comprises an impact device 8 for providing the drilling tool 5 with impact pulses for breaking the rock, and a rotating device 9 for rotating R the drilling tool 5 around its longitudinal axis. The rock drilling machine 4 further comprises a basic body 10 for mounting the impact device 8, the rotating device 9, and possible other devices and elements needed. The rock drilling machine 4 may be moved on the feed beam 3 by means of a feed device 11 in a drilling or feed direction A and in a return direction B. The rock drilling machine 4 is hydraulically operable whereby the impact device 8 and the rotating device 9 are connected to a hydraulic system HS. Further, the impact device 8 may be in accordance with the solution disclosed in this document and may thereby comprise the disclosed valve cylinder.

Figure 2:
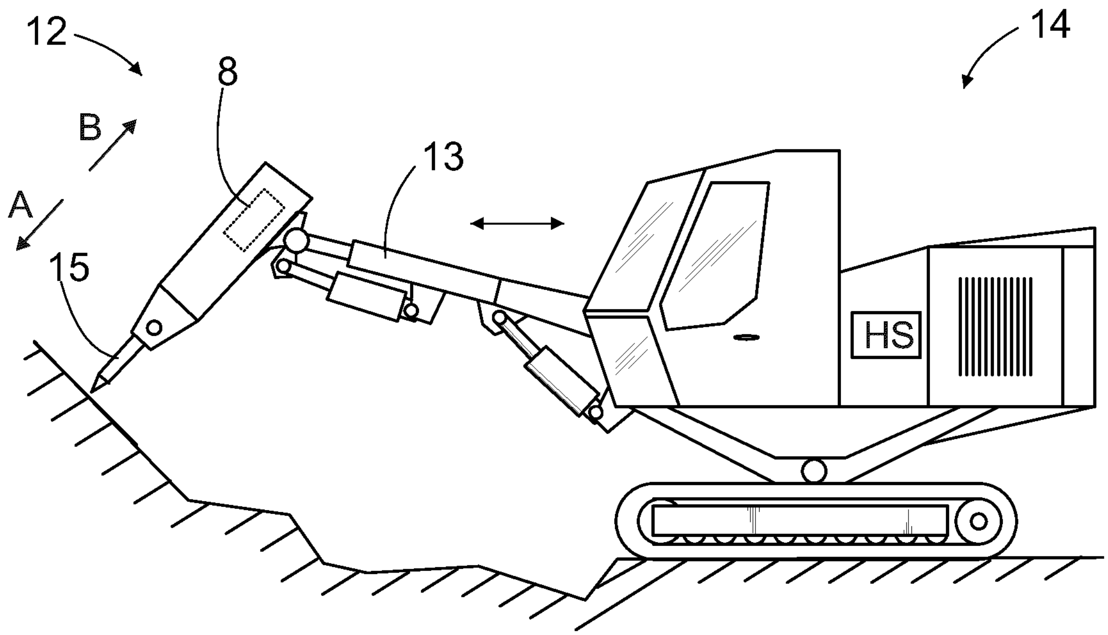
FIG. 2 is a schematic side view of an excavator provided with a hydraulic breaking hammer.

FIG. 2 discloses a hydraulic breaking hammer 12 mounted to a boom 13 of an excavator 14 and connected to a hydraulic system HS of the excavator 14. The breaking hammer 12 comprises a hydraulic impact device 8 for generating impact pulses to a breaking tool 15 connectable to the breaking hammer 1. The breaking tool 15 can move in an impact direction A and a return direction B during the rock breaking. The impact device 8 may be in accordance with the solution disclosed in this document and may thereby comprise the disclosed valve cylinder.

Figure 3:
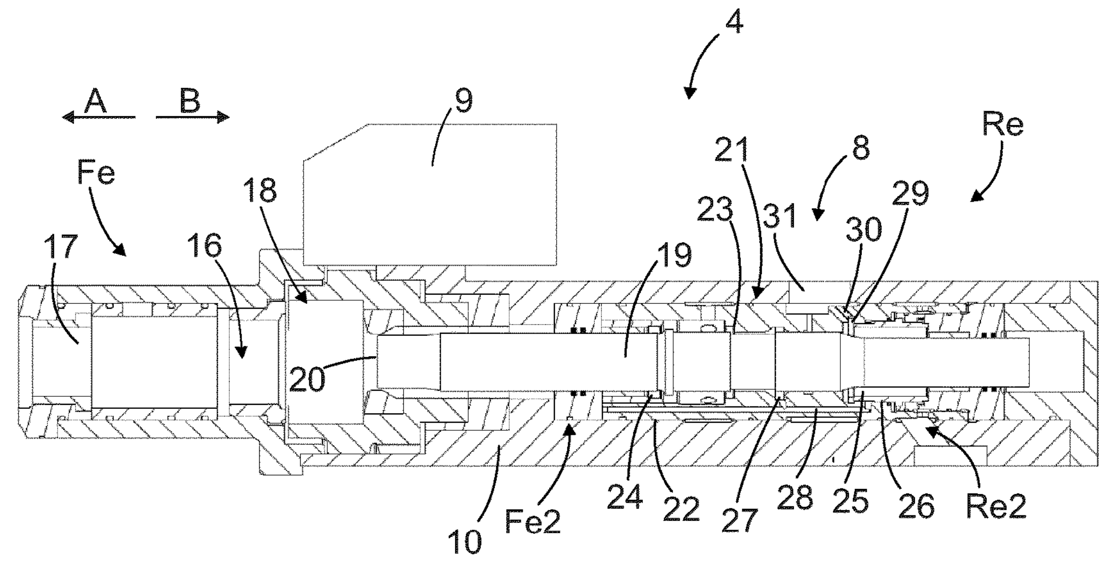
FIG. 3 is a schematic and cross-sectional side view of a rock drilling machine comprising a hydraulic impact device.

FIG. 3 discloses a rock drilling machine 4 comprising a body 10, an impact device 8, a rotating device 9, a flushing housing 16, an open space 17 for receiving a shank adaptor, and a gear housing 18. The flushing housing 16 and gear housing 18 are located at a front end Fe of the body 10, whereas the impact device 8 is located at a rear end Re. The shank adapter can be mounted to the open space 17 and its rear end can be connected to rotating elements at the gear housing 18 so that the shank adapter and a drilling tool connectable to the shank adapter can be rotated by means of the rotating device 9. Flushing fluid can be fed via the flushing housing 16 to an axial flushing channel of the shank adapter and further to the drilling tool.

The impact device 8 comprises a percussion piston 19 which is arranged to move in a reciprocating manner in the impact direction A and return direction B. At a front end of the percussion piston 19 is an impact surface 20 which is configured to strike the shank adapter. The impact device 8 comprises a percussion cartridge 21 which is arranged axially inside a rear portion Re2 of a central space 22 of the body 10. The percussion cartridge 21 comprises a valve cylinder 23 through which the percussion piston 19 passes. The impact device 8 comprises a working pressure space 24 provided with hydraulic pressure fluid for moving the percussion piston 19 in the reverse direction B. There is a control pressure space 25 at a rear end Re2 of the valve cylinder 23. The control pressure space 25 is provided with a sleeve-like control valve 26 for controlling hydraulic pressure affecting at the control pressure space 25 and to thereby control reciprocating movement of the percussion piston 19. The pressure in the control valve space 25 moves the percussion piston 19 in the impact direction because working pressure areas of the percussion piston in the impact direction A are greater therein compared to working pressure areas or the percussion piston at the working pressure space 24 and affecting in the return direction B. In the working pressure space 24 there may prevail continuous high pressure during the operation, whereas in the control pressure space 25 magnitude of the pressure can be changed by means of the control valve 26 for making the percussion piston 19 to execute the reciprocating movement. Further, the valve cylinder 23 is provided with a pilot pressure space 27 for providing pressure pulses in response to movement of the percussion piston 19 in the impact direction A. The valve cylinder 23 is further provided with several axial fluid channels 28 for connecting the pilot pressure space 27 and the control pressure space 25. The pressure pulses generated in the pilot pressure space 27 affect on control surfaces of the control valve 26 and make it to change its control position.

The control pressure space 25 is provided with an inner radial groove 29 at a front end portion Fe2 of the control pressure space 25. Bottom of the radial groove 29 is provided with one or more transverse fluid channels 30 providing fluid connection between the groove 29 and a pressure port 31. The purpose of the radial groove 29 is to provide an enlarged space at the transverse fluid channels 30 and to thereby prevent hydraulic cavitation when the control valve 26 executes control measures.

The impact device 8 disclosed in FIG. 3 may be utilized also in a rock breaking hammer. Then there is no rotating device, gearing housing, flushing housing and the shank adapter. The percussion piston may be arranged to strike to an impact surface of a breaking tool.

Figure 4:
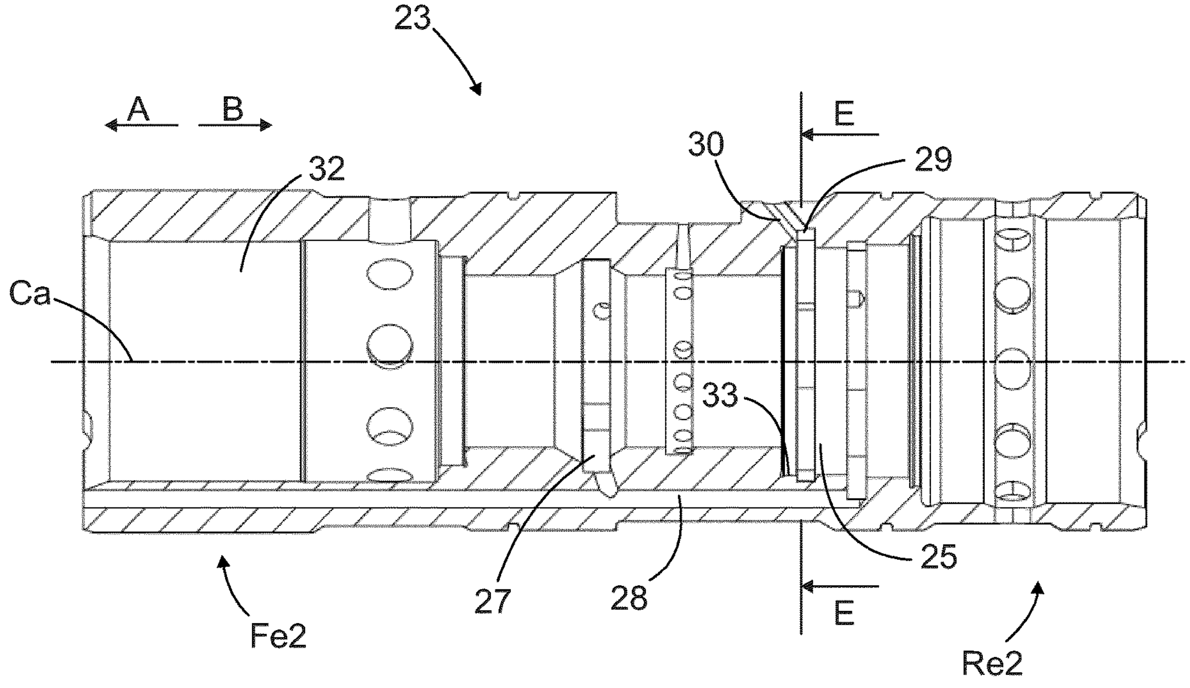
FIG. 4 is a schematic and cross-sectional side view of a valve cylinder.
Figure 5:
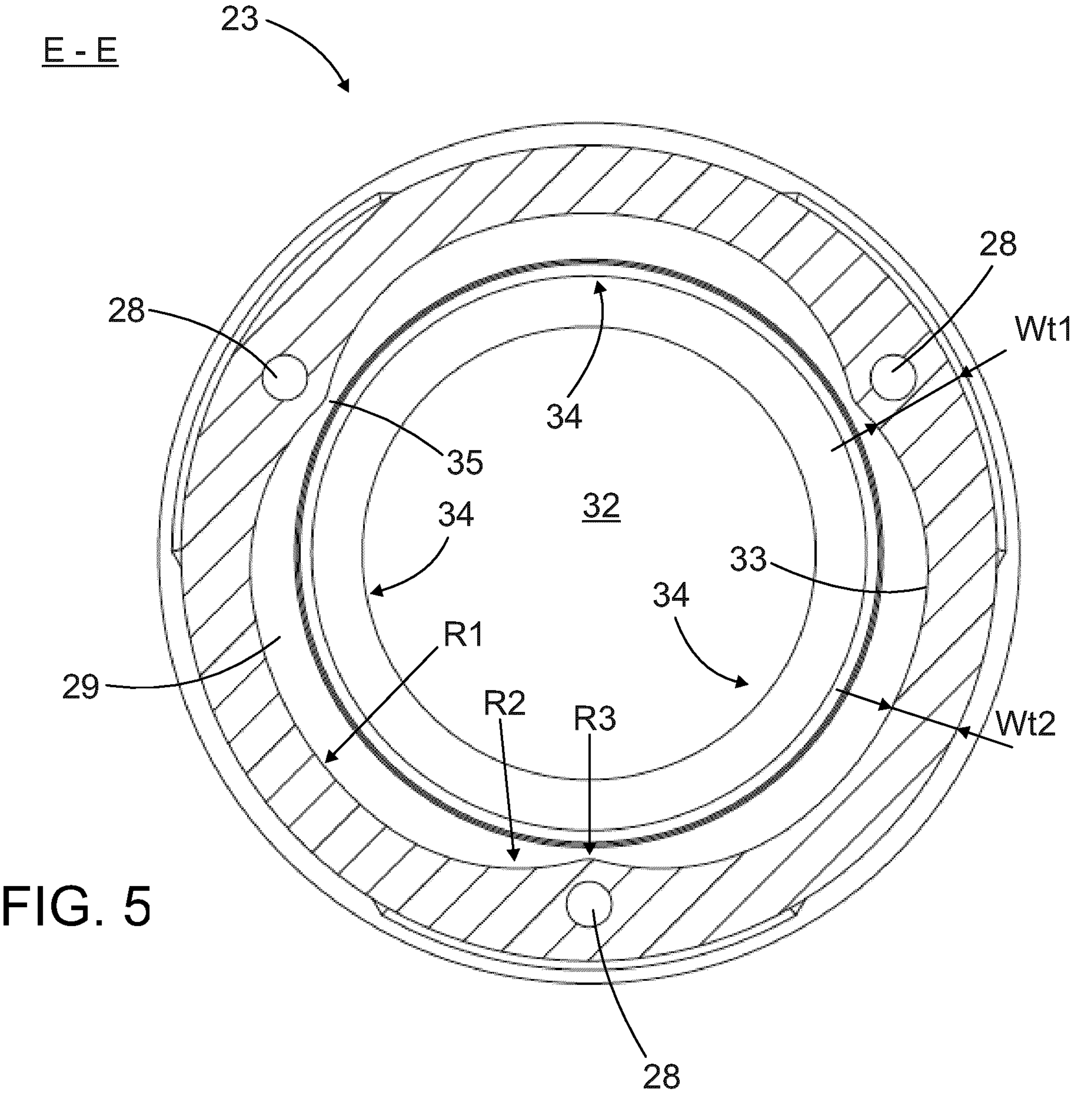
FIG. 5 is a schematic view of the valve cylinder of FIG. 4 cut at a cross-section E-E and showing bottom shape of a groove.

FIG. 4 discloses a valve cylinder 23 of a percussion cartridge. The valve cylinder 23 is an elongated piece with a central axis Ca and comprises a central opening 32 extending from a front end Fe2 of the elongated valve cylinder 23 to its rear end Re2. A percussion piston is mountable through the central opening 32. There are two pressure spaces 25, 27 limited by radial surfaces of the central opening 32 and being located at an axial distance from each other. Several axial pressure fluid channels 28 connect the mentioned pressure spaces 25, 27. A control pressure space 25 is located at the rear end portion Re2 of the valve cylinder 23 and is configured to receive a sleeve-like control valve. The control pressure space 25 is provided with an inner radial groove 29 comprising a bottom surface 33 defining radial extension of the groove 29 in relation to the central opening 32 adjacent the groove 29. The mentioned axial pressure fluid channels 28 pass the radial groove 29 without being in fluid connection with the groove 29. Further, cross-sectional shape of the bottom of the mentioned radial groove 29 is rotationally non-symmetrical and comprises surfaces at several different distances from the central axis. However, this cannot be seen in the cross section in FIG. 4 but is shown in FIG. 5. The groove 29 is in fluid connection to an outer surface of the valve cylinder 23 by means of one or more transverse fluid channels 30.

FIG. 5 discloses the shape of the bottom surface 33 the groove 29. As can be seen, the bottom surface 33 comprises several curved surfaces with different radiuses R1, R2 and R3. The axial fluid channels 28 are evenly spaced around the central opening 32 in the cross-section at the radial groove 29 whereby there are intermediate sections 34 between the axial fluid channels 28. The groove 29 has its minimum radial dimensions at portions 35 of the axial fluid channels 28 and maximum radial dimensions at the intermediate sections 34. The radial dimensions of the groove 29 at the intermediate sections decrease continuously from the middle towards sections 35 with the axial fluid channels 28, whereby the shapes of the bottoms 33 are curved at the intermediate sections 34. Number of the axial fluid channels 28 may be three and the shapes of bottoms 33 of the grooves 29 at the intermediate sections 34 may be circular arches. Because of the shape of the bottom 33 of the groove 29, a thickness of a wall Wt1 of the valve cylinder 23 at the groove 29 is greater at the fluid channel sections 35 compared to thickness of a wall Wt2 at the intermediate sections 34.

The disclosed enlarged volumes of the grooves and the shapes of the bottoms of the grooves may also be implemented in solutions where there is only one axial fluid channel, and further when there are several axial fluid channels which are not evenly space around the open space of the valve cylinder.

The drawings and the related description are only intended to illustrate the idea of the invention. In its details, the invention may vary within the scope of the claims.

The invention claimed is:

1. A valve cylinder for a hydraulic impact device of a rock breaking apparatus, the valve cylinder comprising:

an elongated piece having a central axis, a front end and a rear end;

a central opening extending from the front end to the rear end, and through which central opening a percussion piston mountable;

at least two pressure spaces limited by radial surfaces of the central opening and being located at an axial distance from each other; and a plurality of axial pressure fluid channels connecting the at least two pressure spaces, wherein one of the at least two pressure spaces is a control pressure space located at the rear end of the valve cylinder and is configured to receive a sleeve-like control valve, wherein the control pressure space is provided with an inner radial groove including a bottom surface defining a radial extension of the inner radial groove in relation to the central opening adjacent the inner radial groove, and wherein the axial pressure fluid channels pass the inner radial groove without fluid connection with the inner radial groove, the inner radial groove having minimum radial dimensions at portions of the axial pressure fluid channels and maximum radial dimension at intermediate sections located between the axial pressure fluid channels, whereby a size of the inner radial groove is increased when compared to a simple groove with a circular bottom surface corresponding to the minimum radial dimensions at the portions of the axial pressure fluid channels.

2. The valve cylinder as claimed in claim 1, wherein the bottom surface of the radial groove includes several curved surfaces.

3. The valve cylinder as claimed in claim 1, wherein the plurality of axial pressure fluid channels comprises three channels.

4. The valve cylinder as claimed in claim 1, wherein the inner radial groove is made by a milling technique.

5. The valve cylinder as claimed in claim 1, wherein the inner radial groove is located at a front end portion of the control pressure space.

6. The valve cylinder as claimed in claim 1, wherein the bottom surface of the inner radial groove is provided with at least one transverse fluid channel providing a fluid connection between the inner radial groove and an outer surface of the valve cylinder.

7. The valve cylinder as claimed claim 1, wherein the axial pressure fluid channels are spaced around the central opening, whereby a cross-section of the valve cylinder includes fluid channel sections and the intermediate sections located between the fluid channel sections, the bottom surface of the inner radial groove being provided with several transverse fluid channels at each intermediate section, and wherein a thickness of a wall of the valve cylinder at the groove is smaller at the intermediate sections compared to the fluid channel sections.

8. An impact device of a rock breaking apparatus, the impact device comprising:

a body provided with a central space;

a percussion cartridge arranged axially inside a rear portion of the central space and including a valve cylinder according to claim 1;

a percussion piston passing through the percussion cartridge and being movable in an impact direction towards a front end of the impact device and in a reverse direction towards a rear end of the impact device;

a working pressure space provided with hydraulic pressure fluid for moving the percussion piston in the reverse direction;

a control pressure space at a rear end of the valve cylinder and being provided with a sleeve-like control valve for controlling hydraulic pressure affecting at the control pressure space and to thereby controlling a reciprocating movement of the percussion piston, wherein the valve cylinder is provided with a pilot pressure space for providing pressure pulses in response to movement of the percussion piston in the impact direction and, wherein the valve cylinder is provided with a plurality of axial fluid channels arranged for connecting the pilot pressure space and the control pressure space.

9. A method of preventing cavitation in a hydraulic impact device of a rock breaking apparatus, the method comprising:

increasing a volume of a hydraulic space between an inner surface of a control pressure space of a valve cylinder of the impact device and an outer surface of a sleeve-like control valve mounted reciprocatively inside the control pressure space, the valve cylinder having a plurality of axial fluid channels;

providing the inner surface of the control pressure space with a groove at a cross-section where there are a plurality of transverse fluid channels arranged for feeding hydraulic pressure fluid to and from the control pressure space; and increasing the volume of the hydraulic space by shaping a bottom of the groove to expand towards an outer surface of the impact device at the transverse fluid channels, wherein the groove has minimum radial dimensions at portions of the axial fluid channels and maximum radial dimensions at intermediate sections between the axial fluid channels, wherein a shape of a bottom line of the groove deviates from a circle, and wherein a size of the groove is increased when compared to a simple groove with a circular bottom surface corresponding to the minimum radial dimensions at the portions of the axial fluid channels.

* * * * *